United States Patent [19]
Fair et al.

[11] 3,718,205
[45] Feb. 27, 1973

[54] BORE HOLE SEISMIC TRANSDUCER

[76] Inventors: Delbert W. Fair, 2221 E. Hartford; Graydon L. Brown, 1528 Autumn Rd., both of Ponca City, Okla. 74061

[22] Filed: June 22, 1970

[21] Appl. No.: 48,252

[52] U.S. Cl. .............181/.5 H, 60/54.5 R, 91/411 A, 92/77, 92/151, 181/.5 EC
[51] Int. Cl. ..........G01v 1/14, F01b 7/04, F15b 5/00
[58] Field of Search.........181/.5 H, .5 EC; 91/411 A; 92/151, 77; 60/54.5 R; 137/82

[56] References Cited

UNITED STATES PATENTS

| | | | |
|---|---|---|---|
| 3,346,066 | 10/1967 | Miller, Jr. et al. | 181/.5 EC |
| 3,221,833 | 12/1965 | Malmberg | 181/.5 EC |
| 3,282,371 | 11/1966 | Miller, Jr. | 181/.5 H |
| 2,941,367 | 6/1960 | Schwab | 60/54.5 R |

*Primary Examiner*—Samuel Feinberg
*Assistant Examiner*—H. A. Birmiel
*Attorney*—Joseph C. Kotarski, Henry H. Huth, Robert B. Coleman, Jr., William J. Miller and David H. Hill

[57] ABSTRACT

A vibrational seismic source device adapted to be lowered in a well bore. The vibrator essentially comprises a volume booster operating an expandable bellows-type source connected between two pistons biased against opposite walls of the bore hole. The volume booster is driven by a hydraulic amplifier which in turn is controlled by a servo hydraulic valve. The hydraulic vibratory system is centered and retained in the well bore by utilizing a packer arrangement totally surrounding the vibrator and adapted to be expanded against the bore hole. A high pressure, high volume hydraulic source is provided up hole and operationally connected to the servo valve, volume booster, and biasing means.

7 Claims, 4 Drawing Figures

INVENTORS
GRAYDON L. BROWN
DELBERT W. FAIR
BY William J. Miller
ATTORNEY

BORE HOLE SEISMIC TRANSDUCER

BACKGROUND OF THE INVENTION

Servo hydraulically controlled vibrators are basically old in the art when considered as a surface seismic source. Oftentimes, however, it becomes necessary to transmit a controlled frequency source below the surface of the earth. For example, if a stratum below the surface were nearly impenetratable, little seismic energy would be transmitted through the stratum and the little that was transmitted, when returned, would be readily absorbed or reflected. Under these conditions it is necessary to inject the seismic source below the highly absorbing stratum. The down hole hydraulic vibrator also provides a better impedance match to the earth and therefore will transmit a larger seismic signal into the earth when compared to the power expended generating the seismic signal.

DISCUSSION OF PRIOR ART

Some forms of down hole vibrational sources have been developed as demonstrated in French patent application No. 382,304, filed July 13, 1964, which issued as French Pat. No. 1,453,356. The vibrator described in the above patent, however, has a surface vibrator which couples to the earth in a manner to generate a vertical vibration. The patent does not describe a down hole vibrator but rather utilizes the hole merely as a means for anchoring a surface vibrator.

U.S. Pat. No. 3,034,594 does describe a vibrator positioned down hole and useful in generating a seismic signal against the walls of the bore hole. The disclosure in this invention, however, does not teach a system for putting a hydraulic vibrator into a bore hole in a manner to generate a high energy seismic source.

It is therefore an object of this invention to generate a seismic signal in a well bore in an efficient manner.

It is a further object of this invention to describe a seismic generator that can be lowered down hole, clamped in place by a packer, and then operated in a manner to generate a high energy seismic signal.

Other objects and features of this invention will become apparent upon reference to the accompanying drawings and specification wherein:

FIG. 1 discloses a cross-sectional view of a bore hole showing a partial cross-sectional view of the down hole vibrator in position in the well bore;

DETAILED DESCRIPTION OF THE PREFERRED EMBODIMENTS

Figures 1, 2, 3, 4:
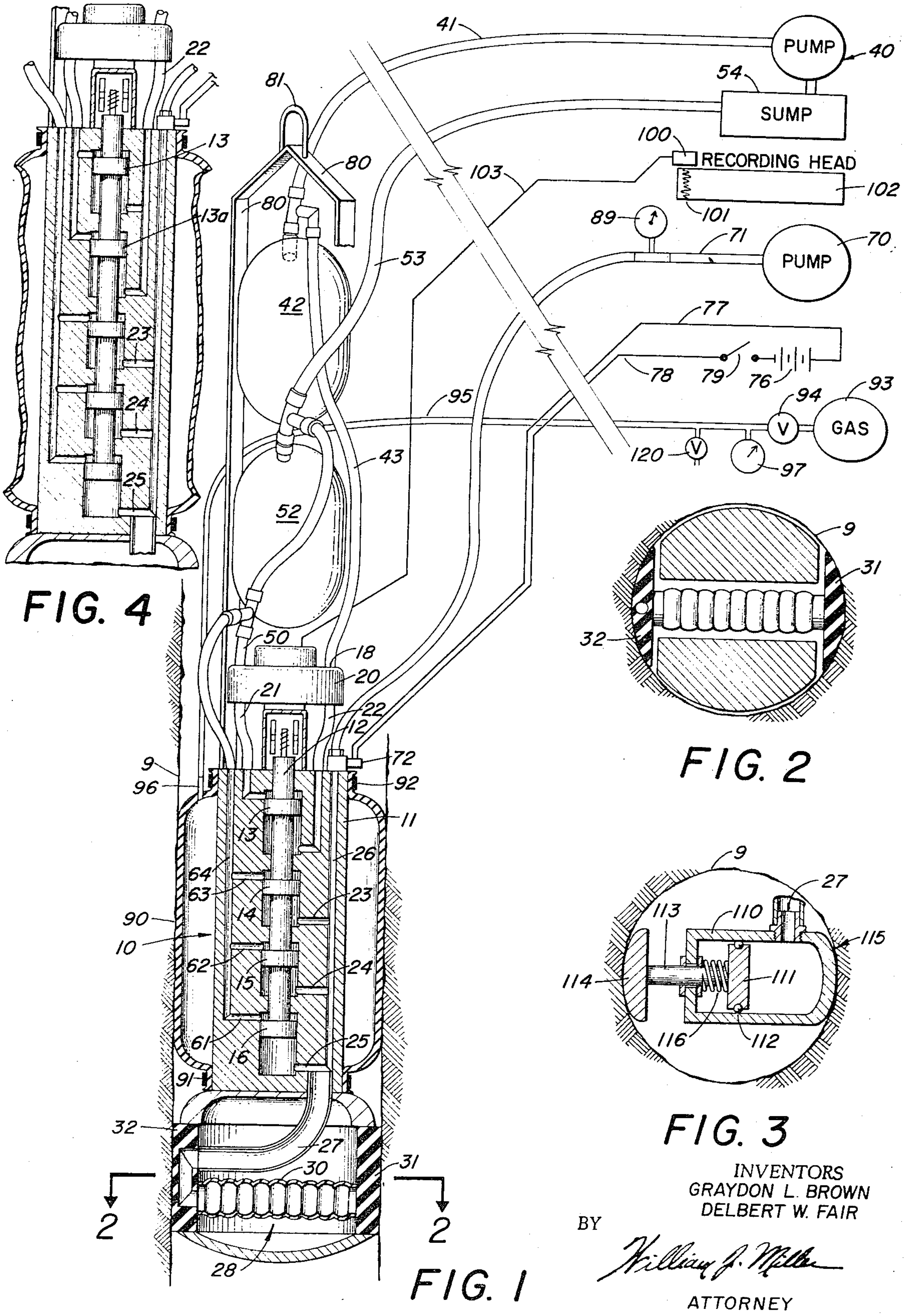
FIG. 2 is a cross-sectional view of the vibrator source taken through lines 2—2 of FIG. 1.
FIG. 3 is a cross-sectional view of a second embodiment of a vibrator source which would operate in a manner similar to that shown in FIG. 2.
FIG. 4 is a modification of the vibrator shown in FIG. 1.

Referring in general to all of the figures but in particular to FIGS. 1 and 2, a vibrator generally referred to as 10 is illustrated. Axially mounted in a housing 11 is a piston shift 12 having axially mounted thereon a driving piston 13 and a plurality of volume boosters or driven pistons 14, 15 and 16. An electrically controlled hydraulic servo valve 20 has a pair of outputs 21 and 22 connected to each side of driving piston 13. A plurality of outputs 23, 24, and 25 are connected in parallel through pipes 26 and 27 to a hydraulic vibrator generally referred to by number 28. Hydraulic vibrator 28 essentially comprises a metal bellows 30 and a pair of pistons 31 and 32. The hydraulic and electrical circuitry for operating the down hole vibrator essentially comprises a high pressure pump 40 connected through a high pressure line 41 to a hydraulic accumulator 42. A line 43 connects the output of accumulator 42 with the inlet 18 of servo valve 20. The return from servo valve 20 is connected through pipe 50 to accumulator 52 through pipe 53 to a sump 54. Oil leakage accumulating on the back side of pistons 14, 15 and 16 is drained through pipes 61, 62 and 63 to pipe 64 into accumulator 52. The hydraulic fluid necessary to operate the hydraulic booster portion of vibrator 10 is supplied through a pump 70 through pipe 71 to electrical shutoff valve 72, then to pipe 26. Valve 72 is electrically opened or closed by means of battery 76 connected to valve 72 through wires 77 and 78. A switch 79 makes or breaks the current applied through wire 78. A frame 80 is mechanically tied to the housing of vibrator 10 and is primarily utilized to mechanically anchor accumulators 42 and 52 and to provide a means of attaching the cable (not shown) such as through an eye 81.

A recording head 100 positioned over a drum 102 is adapted to sense a recorded signal 101 which may be, for example, a magnetically recorded signal shown illustratively on said drum. Recording head 100 is connected through a playback amplifier and electronics represented by box 99, the output of which is connected through wire 103 to servo valve 20.

A packer arrangement 90 used to anchor the vibrator 10, generally made of a flexible material such as rubber, surrounds vibrator 10 and is sealingly clamped to vibrator 10 by means of a pair of bands 91 and 92.

The inflating means for packer 90 comprises a source of compressed gas 93 such as air and is connected through a valve 94 to pipe 95 which communicates to the inlet 96 of packer 90. A valve 120 is also connected to line 95 and permits release of the air pressure within packer 90 to the outside air or environment. Gauge 97 is also connected to air line 95 and is useful in indicating the pressure being applied to the packer 90.

FIG. 2 is a cross-section taken through lines 2—2 of FIG. 1 and better illustrates the pistons 31 and 32 biased against the well bore 9.

FIG. 3 discloses a modified vibrator device which can obviously be substituted for the metal bellows and piston arrangement shown in FIGS. 1 and 2. Inlet pipe 27 is connected to a piston housing 110 having a piston 111 sealed by a means such as an O-ring 112. A piston rod 113 is connected axially to the surface of piston 111 and to a piston 114 which is in contact with bore hole wall 9. The other end 115 of hydraulic cylinder 110 is likewise in contact with the inner surface of bore hole 9. A biasing spring 116 causes piston 111 to be urged toward end 115, thereby retracting the system to its smallest over-all length, facilitating removal of the vibrator from the bore hole.

OPERATION

The seismic vibrator previously described operates as follows:

Under normal operations a cable would be connected to eye 81 and the entire apparatus lowered to a desired depth in the bore hole. Compressed air source 93 would then be applied to piston 95 by opening valve 94 inflating the rubber packer 90 by an amount sufficient to retain the vibrator in a desired location in the bore hole. Gauge 97 provides an indication when sufficient air pressure is achieved. Once the location is proper and anchoring is secure, valve 94 may be shut off. Pump 70 will then be actuated with switch 79 closed, opening valve 72. Pump 70 will then force hydraulic fluid under pressure down line 71 to pipe 26, increasing the pressure in the line and transmitting this increased pressure to pistons 31 and 32. The increased pressure will bias the pistons against bore hole wall 9. The bias will prevent the vibrator from losing contact with the surface of the bore wall when the vibrator is operating. Once sufficient bias is obtained as indicated by gauge 89, switch 79 will be opened shutting off valve 72 and as a consequence maintaining the constant bias created by pistons 31 and 32 against bore wall 9.

Referring generally to the hydraulic system of vibrator 10, a servo valve 20 applies hydraulic fluid to each side of piston 13. Thus, when pipe 22 is pressured with hydraulic fluid, pipe 21 will be operating as an outlet, forcing piston 13 upwardly. When pipe 21 is operating under hydraulic pressure, pipe 22 will operate as an outlet, forcing piston 13 downwardly. The to and fro operation of piston 13 will transmit mechanically through shaft 12 to pistons 14, 15, and 16. Hydraulic fluid in the chambers of each of the respective pistons will cause a volume and/or pressure amplification of the signal transmitted by piston 13. Thus, when piston 13 is forced downwardly, a large quantity of hydraulic fluid will be forced through pipes 23, 24, and 25 to pipes 26 and 27 thence to metal bellows 30. An increase in the volume of hydraulic fluid in bellows 30 will cause the pistons 31 and 32 to be pressed against the sides of the bore hole 9. When the reverse flow at piston 13 occurs and piston 13 is forced upwardly, a decrease in the pressure of the hydraulic fluid will occur in metal bellows 30 causing the pressure exerted by pistons 31 and 32 to decrease.

Drum 102, when operated, will move recording signal 101 under recording head 100 transmitting the picked up signal from the recording head 100 through a playback amplifier and electronics 99, through line 103 to the electrically controlled servo valve 20. Servo valve 20 will then operate in accordance with the signal picked up and transmit this signal to piston 13.

It is, of course, obvious that the signal being transmitted on wire 103 can be of any electrical type signal from any source other than recording head 100. For example, the signal could be from a digital recorder or could be a pulse source generated by simple opening or closing a switch.

The operation of the pump 40 is standard for hydraulic systems. Pump 40, for example, may be a 3,000-pound pressure pump having a flow in gallons per minute as desired. The accumulators 42 and 52 generally are used to supply sufficient hydraulic fluid for low frequency signals and for eliminating much of the pulsation transmitted to the pipes 53 and 41 by the variation in pressure generated inside the servo valve 20 and driving piston arrangement 13.

It is obvious that pump 70 and pump 40 could be the same pump. Separate pumps were shown to simplify and better explain the operation of the vibrator.

Operation of the device shown in FIG. 3 is identical to that of the metal bellows shown in FIG. 2; however, the metal bellows having a naturally engineered returning force do not, of course, require spring 116.

When it is desired to remove the vibrator from the well, a valve 120 is opened (94 should be closed), reducing the air pressure in line 95, causing rubber packer 90 to collapse.

Pump 70 should be shut off and valve 74 opened to reduce the pressure in bellows 30, removing the bias of the pistons 31 and 32 from the bore hole wall 9. Since the pistons have retracted and the packer is no longer inflated upwardly, tension on eye 81 should easily remove the equipment from the bore hole.

Referring to FIG. 4, another embodiment of the invention should and described in FIG. 1 is illustrated. Since the driving mechanism, accumulators, and vibrator assembly are identical to that illustrated in FIG. 1, these items have not been illustrated in this Figure. The primary difference between the embodiment shown in FIG. 4 and that shown in FIG. 1 comprises the ratio of driving pistons to driven pistons. Rather than a single driving piston 13, FIG. 4 illustrates two driving pistons 13 and **13*a*** operating a similar number of driven pistons. The primary purpose for varying the ratio between the driving pistons and driven pistons is to better accommodate the vibrator to small bore hole sizes and to properly match the impedance of the hydraulic system to the base plate load which, of course, is accomplished by varying the relative piston areas or the stroke of the pistons. It is obvious, of course, that any combination of driving or driven pistons can be used in order to obtain the proper hydraulic amplification, impedance matching, and dimensions for the vibrator.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A vibrator adapted to be lowered in a well bore comprising an elongated housing having a diameter less than the diameter of said well bore, said housing including therein a hydraulic booster, a hydraulic amplifier operationally connected to said hydraulic booster and an electrically controlled servo valve having its output coupled to said hydraulic amplifier; hydraulic pump means; line means connected between said pump means and the hydraulic ports of said servo valve to communicate hydraulic fluid to and from said valve; means for communicating hydraulic fluid to said hydraulic booster; valve means imposed in said last-mentioned communication means for remotely closing and opening said communication means; vibrator means mounted to said housing and normal to the axis of said elongated housing, said vibrator means comprising first and second pistons; and means for communicating the output from said hydraulic booster between said first and second pistons.

2. A device as described in claim 1 including expandable packer means surrounding said housing and means for expanding said packer and deflating said packer whereby said vibrator may be lowered into a well bore and said packer expanded against the walls of said well bore to secure said vibrator in position and when said packer is deflated said vibrator may be removed from said well bore.

3. A device as described in claim 1 wherein said means for remotely controlling said valve means comprises a source of electricity and a switch and means for connecting said source of electricity to said valve.

4. A device as described in claim 2 wherein said means for expanding said packer and for deflating said packer comprise a source of gas, conduit means connecting said source of gas to said packer, a first valve means interposed in said conduit means, and a second valve connected between said conduit means and the environment, whereby, when said second valve is closed and said first valve is opened, gas will be applied to said bellows and, when said first valve is closed and said second valve is opened, the gas within said bellows will be permitted to escape to said environment.

5. A device as described in claim 1 wherein said vibrator includes at least one driving piston and two driven pistons.

6. In a seismic vibrator having a power hydraulic piston, an improvement comprising a hydraulic booster system for said power hydraulic piston comprising an elongated housing, a plurality of cylindrical chambers formed in said housing, said plurality of cylindrical chambers comprising a first and second set, each of which is aligned along the axis of the housing and each cylindrical chamber being axially oriented; a piston shaft means mounted in communication with each of said cylindrical chambers, the axis of said piston shaft falling along the axis of said chambers; piston means mounted on said piston shaft and in each of said cylindrical chambers, each piston means secured to said piston shaft so that the piston occupies the same position in each of said chambers; servo control means having a pair of outputs, said pair of outputs communicating with opposite ends of said first set of said cylindrical chambers; means for communicating the same end of said second set of said cylindrical chambers of an output whereby operation of said servo control means will force the pistons in said first set of cylindrical chambers toward one end and then the opposite end of said cylindrical chambers, causing said piston shaft to move the pistons in said second set of cylindrical chambers, resulting in alternate compression and decompression of hydraulic fluid in said second set of cylindrical chambers, said alternating compression and decompression being exhibited at the output of said second set of cylindrical chambers.

7. Means for biasing a hydraulically controlled vibrator which generates a continuous frequency signal of predetermined frequency and time duration against a bore hole wall comprising a housing; a vibrator comprising a piston having a first and second face; means for mounting said piston to said housing so that said first and second face is normal to said housing; hydraulic means communicating with said piston such that when said hydraulic fluid is forced into said piston said first and second face will be forceably biased against said bore hole wall; and means for retaining said hydraulic fluid under pressure in said piston.

* * * * *